United States Patent Office 3,504,827
Patented Apr. 7, 1970

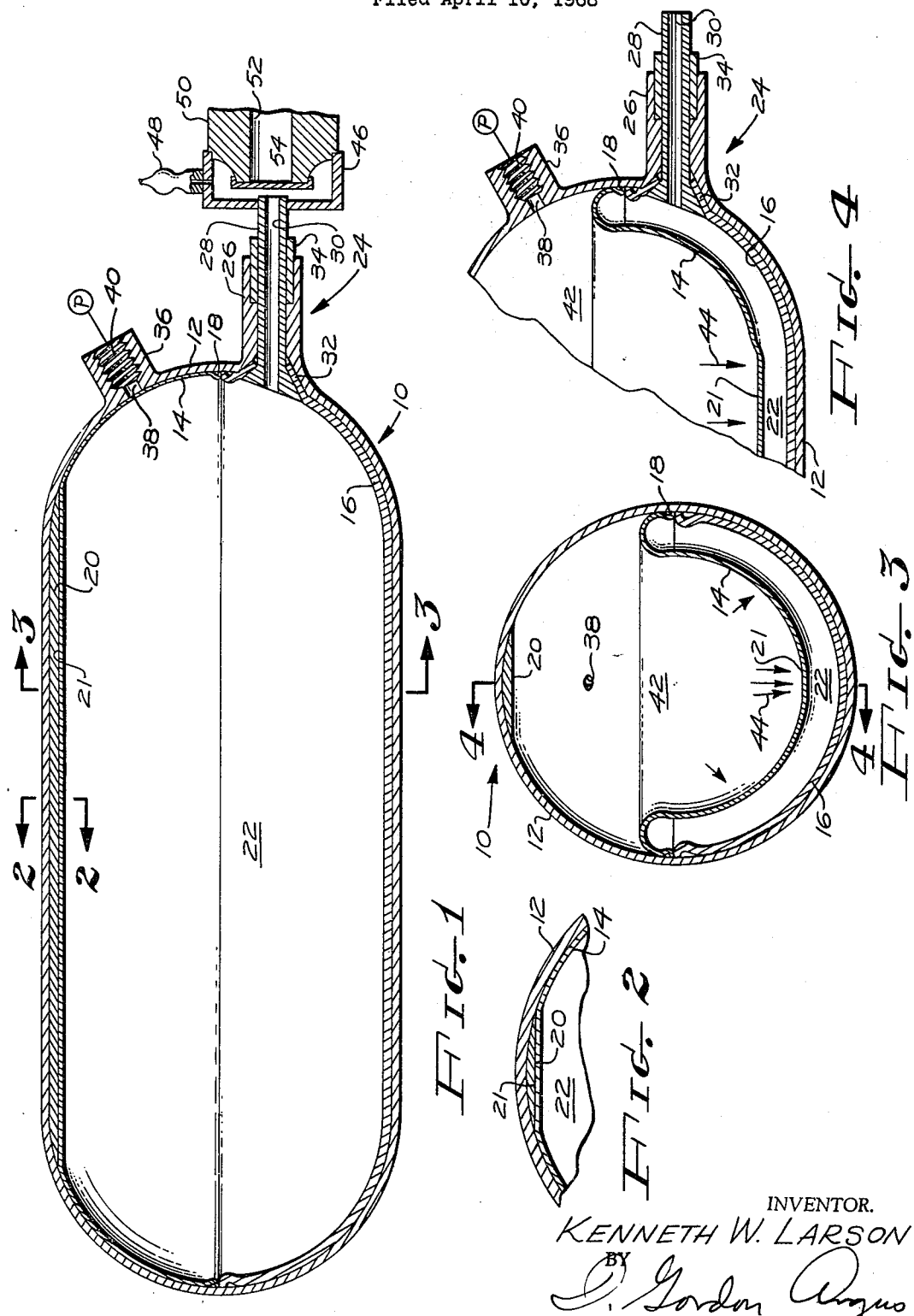

3,504,827
PRESSURE OPERABLE STORAGE AND
EXPULSION CONTAINER
Kenneth W. Larson, Long Beach, Calif., assignor to
Aerojet General Corporation, El Monte, Calif., a
corporation of Ohio
Filed Apr. 10, 1968, Ser. No. 720,137
Int. Cl. B65d 35/28
U.S. Cl. 222—95                                    16 Claims

ABSTRACT OF THE DISCLOSURE

A container according to the present disclosure includes a deformable metallic bladder which is capable of expelling fluid contained therein by deformation of the bladder. A pressurant is utilized for deforming the bladder.

---

This invention relates to devices for containing and expelling fluids.

Propellants for rocket engines have heretofore been stored in containers having an inner surface constructed of a material which is not corrodable by the propellant. Heretofore, some storage containers, known as pressurized feed storage systems, have relied on pressure on the propellant to force propellant from the container. However, when a rocket carrying such containers was subjected to a reduced, or negative gravity, the propellant might collect at an end of the container opposite from the outlet, thereby resulting in little, if any, delivery of propellant to the rocket engine. To overcome the problems associated with pressurized feed storage systems, positive expulsion systems were developed which, in their most basic form, included a plastic or rubber diaphragm within the container. A pressurant, such as helium, was introduced into the container on the opposite side of the diaphragm from the propellant and the pressure of the pressurant against the diaphragm forced the propellant through the outlet.

The diaphragm system did not work well for containers which were designed to contain propellant for long periods of time. It has been found that plastic and rubber used in diaphragms were not completely impervious to propellants and pressurants. Thus, propellant leaked through the diaphragm into the pressurant and pressurant leaked into the propellant.

It is an object of the present invention to provide a device capable of containing and expelling fluid, which device is capable of positively expelling substantially the entire volume of fluid contained therein.

Another object of the present invention is to provide a device for the containment of fluids, which device is provided with a bladder which is not corrodable by the fluid and which will collapse to expel the fluid under pressure from the container.

Another object of the present invention is to provide a collapsible bladder which is impervious to fluid contained therein.

The present invention is carried out by means of a metallic bladder within a storage tank. The bladder is deformable so that when pressurant is delivered between the bladder and the tank walls, the bladder will deform to expel fluid from the container.

According to an optional and desirable feature of the present invention, the bladder is preferably cylindrical in shape and a half-cylindrical portion of the bladder is sufficiently deformable to reverse its shape to expel the fluid.

The above and other features of this invention will be more fully understood from the following detailed description and the accompanying drawings, in which:

FIG. 1 is a side view elevation in cutaway cross-section of a container according to the presently preferred embodiment of the present invention;

FIG. 2 is a fragmentary view taken at line 2—2 in FIG. 1;

FIG. 3 is a section view taken at line 3—3 in FIG. 1 but with a bladder at a different position from that illustrated in FIG. 1; and FIG. 4 is a view taken at line 4—4 in FIG. 3.

Referring to the drawings, there is illustrated a tank 10 having an exterior shell 12. Shell 12 may be constructed of any suitable material, such as stainless steel heat treated to 190,000 p.s.i. tensile strength. It is to be understood that other materials, such as 2219 or 6061 high-strength aluminum may be used in the construction of shell 12. It is preferred that shell 12 be of sufficiently high strength as to withstand the injection of pressure within the storage tank. Within shell 12 is a hermetically sealed malleable bladder constructed of metallic sections 14 and 16. By way of example, section 14 may be Type 1100 aluminum having a wall thickness between 0.005 and 0.020 inch, and section 16 may be twice the thickness of section 14 and may be constructed of the same material as section 14. Sections 14 and 16 are hermetically sealed by longitudinal seam 18 to form the metallic transversely collapsible bladder. By way of example, seam 18 may be diffusion bonded. Other suitable sealing methods include electron beam welding, arc welding, explosive welding, braze welding, and ultrasonic welding. Of course, the bladder may be constructed of a single material by electrical and/or vapor deposition on the inside surface of shell 12, thereby eliminating the need for separate sections. In either case, the bladder is not fixed to shell 12. The bladder formed by sections 14 and 16 forms a hermetically sealed chamber 22 for the containment and storage of fluids such as propellants for rocket engines.

Rib 20 is fixed to the upper portion of the shell to form a flat surface 21 on bladder section 14 along its longitudinal axis.

Fitting 24 provides fluid communication to chamber 22 and comprises an extended portion 26 preferably constructed of the same material as shell 12 and an insert 28 constructed of the same material as the bladder. The insert is fitted within extended portion 26 and includes passage 30 in fluid communication with chamber 22. Lip 32 of section 16 is sandwiched between extended portion 26 and insert 28 and is welded or otherwise attached to insert 28. If desired, fitting 34 is fixed to portion 26 and insert 28 to provide an adequate bimetal weld between the parts.

Fitting 36 is fixed to wall 12 and provides fluid communication by means of passages 38 to the interior of wall 12 opposite section 14. Fitting 36 preferably includes suitable attachment means, such as threads 40, for attachment to pump P so that passage 38 may be brought into fluid communication with a suitable source of pressurant (not shown).

If desired, a burst diaphragm and fill port may be connected to insert 28. Housing 46 is fixed to insert 28 so that the interior of housing 46 is in fluid communication with passage 30. Fill port 48 is fixed to housing 46 and is in fluid communication with the interior of the housing. Housing 50 is fixed to housing 46 and includes passage 52 adapted to supply fluid to a utility device, such as an injector of a rocket engine. Burst diaphragm 54, having a design load limit, is fixed to housing 50 and closes one end of passage 52.

In operation, the bladder within container 10 is filled with propellant, or other suitable fluid, by admitting such fluid through fill port 48, passage 30, and into chamber 22. When chamber 22 is sufficiently filled with fluid, fill port 48 is closed.

When it is desired to expel the fluid within chamber 22 from the container, pressurant is admitted through passage 38 of fitting 36. The pressurant reacts against the deformable walls of section 14, thereby deforming the section as illustrated in FIGS. 3 and 4. Rib 20 maintains a substantially flat section 21 at the top of section 14 against which the pressurant reacts to depress the deformable bladder downwardly. As more pressurant is introduced into the chamber 42 above the bladder, the pressurant reacts against the bladder in the direction of arrows 42 to continue to force the bladder downwardly. The bladder continues downwardly until the half-cylindrical section 14 is turned substantially inside out and substantially all of the fluid in chamber 22 is forced out through chamber 30.

Burst diaphragm 54 provides a fluid seal to prevent escape of fluid from chamber 22 until the pressurant is admitted through fitting 48. When the pressure within chamber 42 exceeds the design load limit of diaphragm 54, the diaphragm bursts, thereby permitting positive expulsion of fluid from chamber 22 through passages 30 and 52.

If it is desired to evacuate the bladder before filling it with fluid, it is also desirable to equally evacuate the space between shell 12 and portion 14 of the bladder to prevent deformation of the bladder. In this case, a burst diaphragm (not shown) may be placed in port 38 to close off the port while the bladder and shell are evacuated through evacuation ports (not shown).

Rib 20, mounted to shell 12, maintains a flat indented surface 21 on portion 14 of the bladder. Thus, flat surface 21 will not be deformed by the pressure of fluid in chamber 22 and the surface configuration of flat portion 21 is maintained for optimum deformation characteristics of portion 14.

During deformation, portion 14 has a tendency to contact portion 16 adjacent flat portion 21. It is therefore preferred that passage 30 be located through portion 16 near seam 18 so that portion 14 will not obstruct the passage when it is deformed.

The present invention thus provides a container for containing and storing fluid under pressure and for expelling the fluid when desired. The bimetallic construction provides for a storage container having the strength of shell 12 and yet being substantially noncorrosive by the fluids contained within the chamber due to the construction of bladder 14 and liner 16. One feature of this invention resides in the fact that the bladder is metallic and thereform impervious to the fluids contained therein. The container is capable of expelling substantially all the fluid contained within the container. The device is easily constructed and is effective in use.

What is claimed is:

1. A storage container for storing fluid and for expelling such fluid under pressure, said container comprising: a rigid shell having a substantially cylindrical portion having an axis; a deformable metallic bladder having first and second badder portions, said bladder portions being disposed in said shell and together forming a cavity adapted to contain fluid, said first bladder portion being more deformable than said second bladder portion, said cavity having a substantially cylnidrical portion; elongated rib means mounted to the cylindrical portion of said shell along the axis of the cylindrical portion of the shell and adapted to contact said first bladder portion to form an elongated depressed portion on said first bladder portion which extends into the cavity; outlet means through said second bladder portion and said shell through which fluid may be expelled from said cavity, said outlet means being positioned relative to said rib means so that as said first bladder portion deforms from said depressed portion the fluid in said cavity is expelled through said outlet means; closure means normally closing said opening; and supply means adapted to supply pressurized fluid to the region between said shell and said first bladder portion to thereby deform said first bladder portion.

2. A container according to claim 1 wherein said first bladder portion has a wall thickness between about 0.005 and 0.020 inch.

3. A container according to claim 1 wherein said shell is constructed of a material selected from the group comprising steel and aluminum, and said bladder is constructed of aluminum.

4. A container according to claim 1 wherein said closure means comprises a diaphragm in said outlet means, said diaphragm being adapted to rupture at a design load.

5. A container according to claim 1 wherein said depressed portion is substantially flat.

6. A container according to claim 1 wherein said supply means includes an orifice in said shell opposite said first bladder portion.

7. A container according to claim 6 wherein said first bladder portion has a wall thickness between about 0.005 and 0.020 inch.

8. A container according to claim 6 wherein said shell is constructed of a material selected from the group comprising steel and aluminum, and said bladder is constructed of aluminum.

9. A container according to claim 6 wherein said closure means comprises a diaphragm in said outlet means, said diaphragm being adapted to rupture at a design load.

10. A container according to claim 6 wherein said depressed portion is substantially flat.

11. A storage container for storing propellant and for expelling such propellant under pressure, said container comprising: a rigid shell having a substantially cylindrical portion having an axis; a deformable metallic bladder having first and second bladder portions, said bladder portions being disposed within said shell and together forming a cavity adapted to contain propellant, said first bladder portion being more deformable than said second bladder portion, said cavity having a substantially cylindrical portion; elongaged rib means mounted to the cylindrical portion of said shell along the axis of the cylindrical portion of the shell and adapted to contact said first bladder portion to form an elongated depressed portion on said first bladder portion which extends into the cavity; outlet means through said second bladder portion and said shell through which propellant may be expelled from said cavity, said outlet means being positioned relative to said rib means so that as said first badder portion deforms from said depressed portion the propellant in said cavity is expelled through said outlet means; closure means normally closing said opening; and supply means adapted to supply pressurized fluid to the region between said shell and said first bladder portion to thereby deform said first bladder portion.

12. A container according to claim 11 wherein said first bladder portion has a wall thickness between about 0.005 and 0.020 inch.

13. A container according to claim 11 wherein said shell is constructed of a material selected from the group comprising steel and aluminum, and said bladder is constructed of aluminum.

14. A container according to claim 11 wherein said closure means comprises a diaphragm in said outlet means, said diaphragm being adapted to rupture at a design load.

15. A container according to claim 11 wherein said depressed portion is substantially flat.

16. A container according to claim 11 wherein said supply means includes an orifice in said shell opposite said first bladder portion.

References Cited

UNITED STATES PATENTS

| | | | |
|---|---|---|---|
| 2,646,906 | 7/1953 | Jones et al. | 222—327 X |
| 3,070,265 | 12/1962 | Everett | 222—386.5 |
| 3,091,923 | 6/1963 | Barnes | 222—386.5 X |
| 3,097,766 | 7/1963 | Biehl et al. | 222—386.5 X |
| 3,104,526 | 9/1963 | Hirschfeld et al. | 222—386.5 X |
| 3,197,087 | 7/1965 | Black | 222—386.5 |

SAMUEL F. COLEMAN, Primary Examiner

N. L. STACK, JR., Assistant Examiner

U.S Cl. X.R.

222—541